United States Patent
Moreels

(10) Patent No.: US 11,161,192 B2
(45) Date of Patent: Nov. 2, 2021

(54) DISTORTION FREE ARC WELDING VOLTAGE MEASUREMENT

(71) Applicant: ESAB AB, Gothenburg (SE)

(72) Inventor: Karel Moreels, Sint-Maria-Lierde (BE)

(73) Assignee: ESAB AB, Gothenburg (SE)

( * ) Notice: Subject to any disclaimer, the term of this patent is extended or adjusted under 35 U.S.C. 154(b) by 609 days.

(21) Appl. No.: 15/956,967

(22) Filed: Apr. 19, 2018

(65) Prior Publication Data

US 2019/0321910 A1    Oct. 24, 2019

(51) Int. Cl.
*B23K 9/095* (2006.01)

(52) U.S. Cl.
CPC .................. *B23K 9/0956* (2013.01)

(58) Field of Classification Search
CPC ... B23K 11/256; B23K 11/257; B23K 11/258; B23K 11/252; B23K 11/251; B23K 11/25; B23K 11/24; B23K 9/0953; B23K 9/09556; B23K 9/095; B23K 9/1043; B23K 9/32; B23K 9/0731
USPC ...... 219/110, 108, 111, 116, 121.34, 121.35, 219/130.1, 130.01, 130.21, 130.31, 219/130.33, 136, 137 R, 136 PS
See application file for complete search history.

(56) References Cited

U.S. PATENT DOCUMENTS 3,723,854 A * 3/1973 Kita ........................... G05F 1/44
                                                    323/246
4,151,395 A * 4/1979 Kushner .................. B23K 9/30
                                                    219/124.34
8,946,596 B2 * 2/2015 Peters ..................... B23K 9/091
                                                    219/130.5

(Continued)

FOREIGN PATENT DOCUMENTS

| CN | 104209630 A | 12/2014 |
| CN | 104871012 A | 8/2015 |
| FR | 2861613 A1 | 5/2005 |

(Continued)

OTHER PUBLICATIONS

Extended European Search Report for European Patent Application No. 19166962.1-1016 dated Oct. 25, 2019, 7 pages.

(Continued)

*Primary Examiner* — Tu B Hoang
*Assistant Examiner* — Diallo I Duniver
(74) *Attorney, Agent, or Firm* — Edell, Shapiro & Finnan, LLC

(57) ABSTRACT

Methods and systems to reduce distortions induced in a voltage measurement wire. In an embodiment, a measurement wire is coupled to a head of an arc welding apparatus and to a feedback circuit to provide a head voltage and noise induced on the measurement wire to the feedback circuit. A reference wire is coupled to a reference node and to the feedback circuit to provide noise induced on the reference wire to the feedback circuit. The reference node may be proximate to and electrically isolated from the head, and the measurement wire and the reference wire may be arranged adjacent to one another (e.g., as a twisted pair), so that the similar distortions are induced in the measurement wire and the reference wire. The feedback circuit determines the head voltage as a difference between noise of the reference wire and the head voltage and noise of the first measurement wire.

17 Claims, 9 Drawing Sheets

(56) References Cited

U.S. PATENT DOCUMENTS 9,550,248 B2 * 1/2017 Hearn .................. B23K 9/1043

FOREIGN PATENT DOCUMENTS

| JP | S6396813 A | 4/1988 |
| KR | 101690991 B1 | 1/2017 |
| KR | 101756297 B1 | 7/2017 |

OTHER PUBLICATIONS

Examination Report No. 1 for Australian Patent Application No. 2019202352, dated Apr. 3, 2020, 3 pages.
Office Action for Canadian Patent Application No. 3,038,781, dated Apr. 22, 2020, 6 pages.
Notification of the First Office Action from the China National Intellectual Property Administration for CN Application No. 201910317176.2 with English translation dated Nov. 4, 2020, 22 pages.
Office Action for Canadian Patent Application No. 3,038,781 dated Jan. 12, 2021, 6 pages.

* cited by examiner

DISTORTION FREE ARC WELDING VOLTAGE MEASUREMENT

BACKGROUND

In an arc welding apparatus, a power supply provides a voltage between a welding head and a workpiece. To enable the power supply to maintain power-related operating parameters at desired levels, measurement wires are run from the welding head to the power supply, and from the workpiece to the power supply to supply feedback signals indicative of the arc voltage.

High electrical currents in the power supply cables give rise to magnetic fields. The magnetic fields induce disturbances/noise on the measurement wires. These disturbances distort the voltage feedback signals carried by measurement wires and impact the ability of the power supply to accurately regulate the voltage between the welding head and the workpiece.

Figure 1:
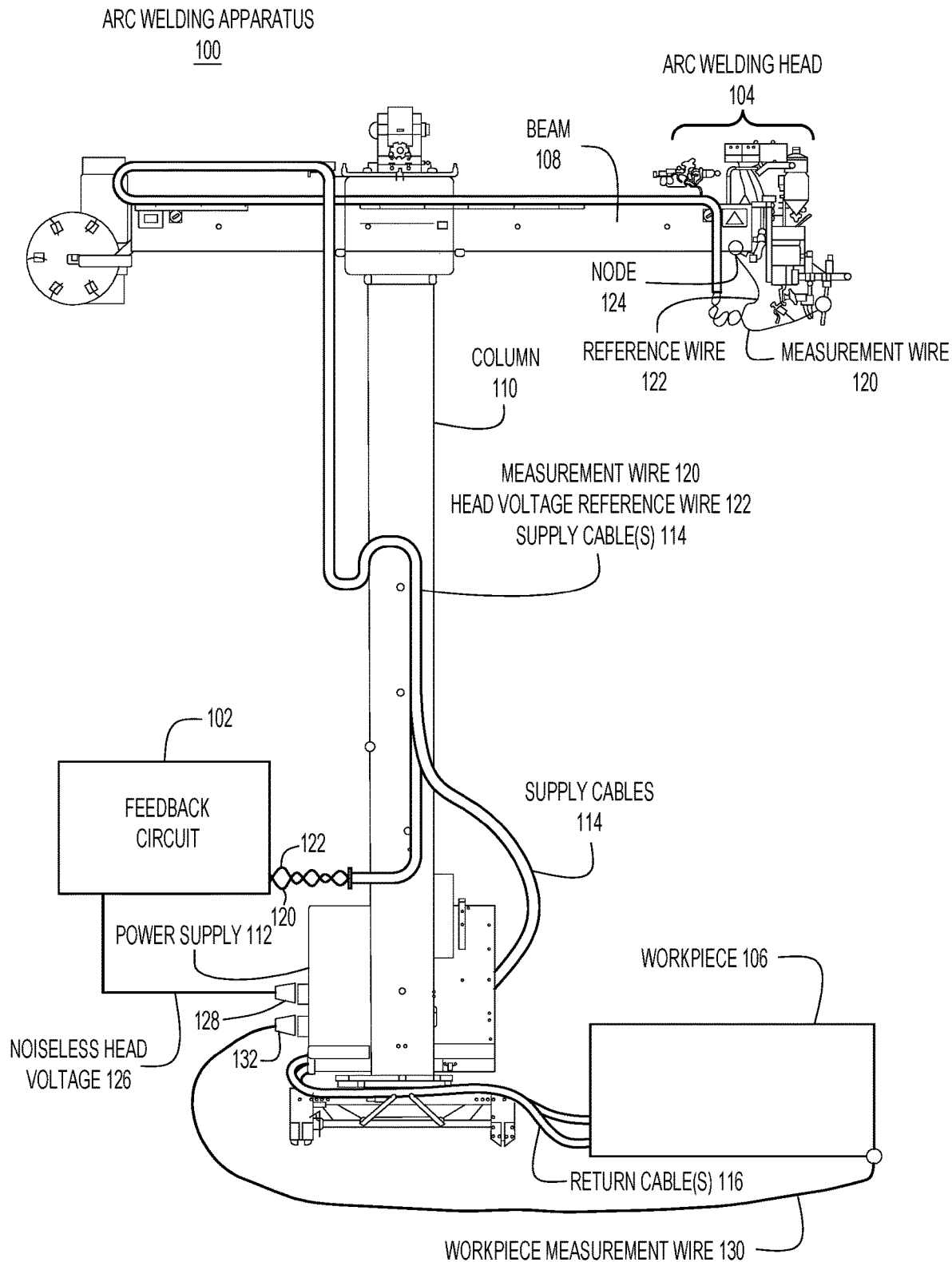
FIG. 1 is an illustration of an arc welding apparatus that includes feedback circuitry to remove distortions/noise induced on a voltage measurement wire.

In the drawings, the leftmost digit(s) of a reference number identifies the drawing in which the reference number first appears.

DETAILED DESCRIPTION

Disclosed herein are techniques to reduce and/or eliminate distortions induced in voltage measurement wires, such as in an arc welding apparatus.

FIG. 1 is an illustration of an arc welding apparatus 100 that includes feedback circuitry 102 to remove distortions/noise induced on a voltage measurement wire.

Arc welding apparatus 100 includes an arc welding head 104 to perform welding operations on a workpiece 106. Arc welding apparatus 100 further includes a beam 108 to support arc welding head 104, and a column 110 to support beam 108. Beam 108 and column 110 may be referred to collectively herein as a frame (e.g., frame 208 in FIG. 2), of arc welding apparatus 100.

Column 110 and beam 108 are electrically conductive and in contact with one another (via steel, bolts, screws, bearings, etc.). Column 110 and beam 108 are electrically isolated from arc welding head 104.

Arc welding apparatus 100 further includes a power supply 112 to provide a voltage across arc welding head 104 and workpiece 106, with a supply cable(s) 114 to arc welding head 111 and a return cable(s) 116 from workpiece 106.

Arc welding apparatus 100 further includes a measurement wire 120 coupled to a node of arc welding head 104 to provide a signal indicative of the voltage of arc welding head 104 to feedback circuitry 102.

Measurement wire 120 may be subject to disturbances. The disturbances may include noise induced by magnetic fields generated from current through supply cable(s) 114 and/or return cable(s) 116, of arc welding apparatus 100 and/or other arc welding apparatuses.

To compensate for disturbances on measurement wire 120, arc welding apparatus 100 further includes a reference wire 122 coupled to a reference node 124 of arc welding apparatus 100, and to feedback circuitry 102. Node 124 is proximate to and electrically isolated from arc welding head 104. Node 124 and arc welding frame 208 are electrically conductive and may be nominally coupled to ground or other voltage reference.

Measurement wire 120 and reference wire 122 are arranged proximate and/or adjacent to one another along a path to feedback circuitry 102, so that reference wire 122 is subjected to the same or similar disturbances as measurement wire 120. In this way, at the inputs to feedback circuitry 102, measurement wire 120 includes a sum of a voltage of arc welding head 104 and a disturbance $V_m$, and reference wire 122 includes disturbance $V_m$.

In an embodiment, wires 120 and 122 are configured as a twisted pair of wires.

Feedback circuitry 102 is configured to subtract the voltage of reference wire 122 from the voltage and noise of measurement wire 120, to provide an essentially noiseless measure of the voltage of arc welding head 104, as noiseless head voltage 126, to an input 128 of power supply 112.

Arc welding apparatus 100 further includes a workpiece measurement wire 130 to provide a voltage of workpiece 106 to an input 132 of power supply 112.

Power supply 112 may be configured to control the power (e.g., voltage, current, etc.) applied to supply cable(s) 114 and 116 based on inputs 128 and 132.

Figure 2:
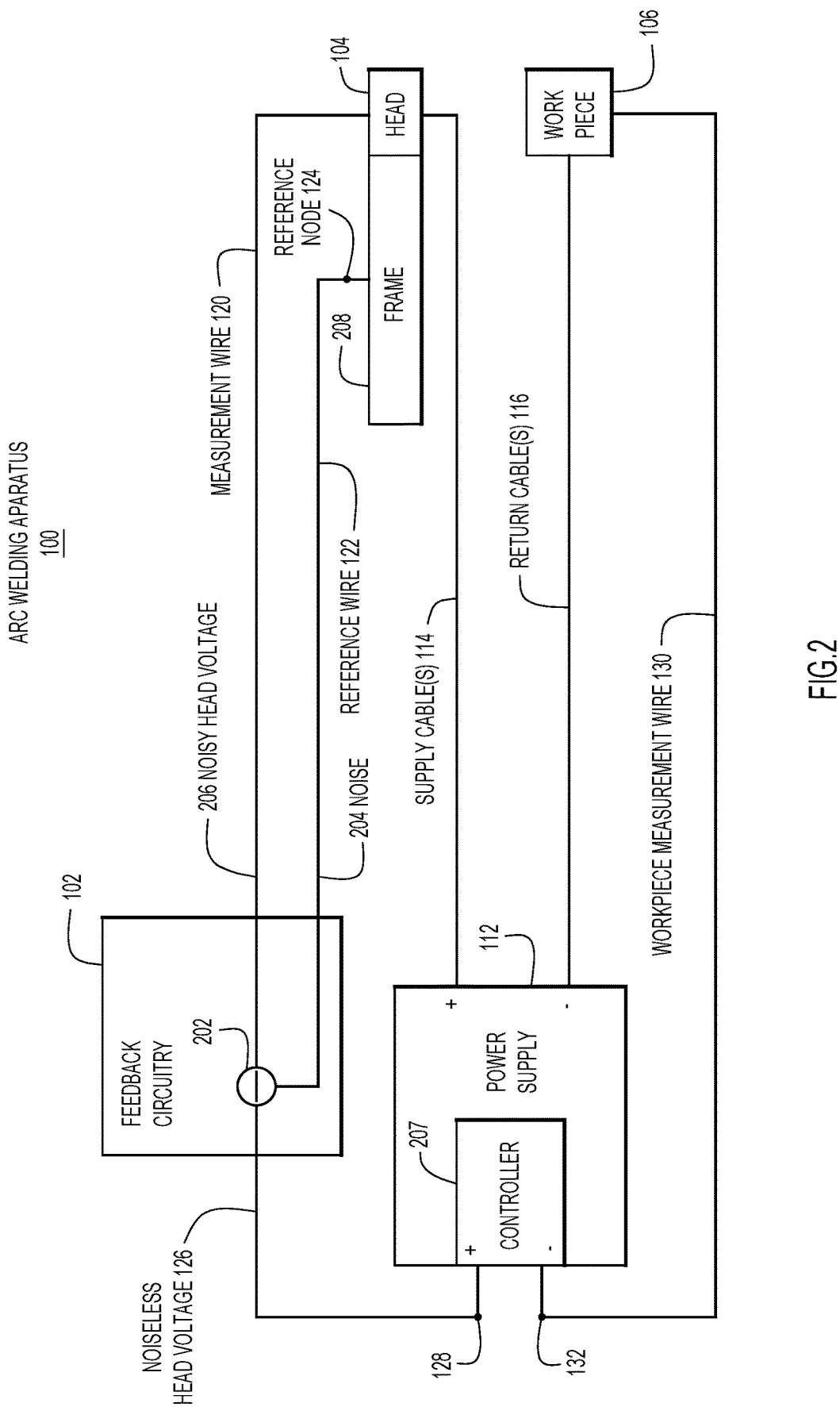
FIG. 2 is a simplified block wiring diagram of the arc welding apparatus, in which the feedback circuity includes subtraction circuitry to subtract noise of a reference wire from a noisy head voltage of a measurement wire.

FIG. 2 is a simplified block wiring diagram of arc welding apparatus 100, in which feedback circuity 102 includes subtraction circuitry 202 to subtract noise 204 (i.e., $V_m$) of reference wire 122 from a noisy head voltage 206 of measurement wire 120.

Further in FIG. 2, power supply 112 includes a controller 207 to maintain a desired voltage across head 104 and workpiece 106, based on a difference between noiseless head voltage 126 and a voltage of workpiece 106 (i.e., at input 132).

Figure 3:
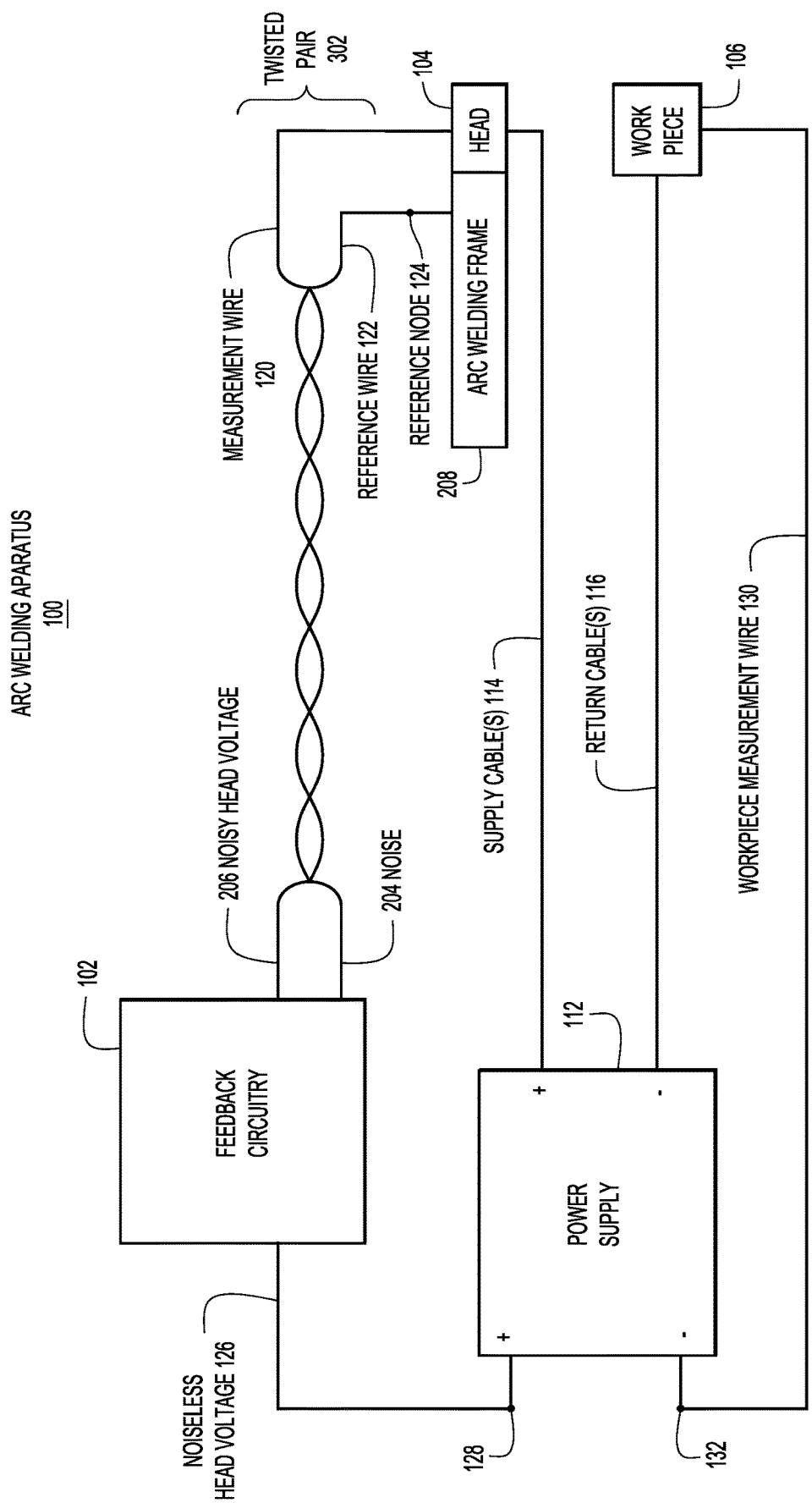
FIG. 3 is another simplified block wiring diagram of the arc welding apparatus, in which the measurement wire and the reference wire are configured as a twisted pair.

FIG. 3 is another simplified block wiring diagram of arc welding apparatus 100, in which measurement wire 120 and reference wire 122 are configured as a twisted pair of wires 302. Configuring measurement wire 120 and reference wire 122 as a twisted pair may help to ensure that reference wire 122 is subjected to the same or similar disturbances as measurement wire 120, such that noise 204 induced on reference wire 122 (i.e., $V_m$), is the same or similar to noise induced on measurement wire 120. Methods and systems disclosed herein are not, however, limited to twisted pair wires.

Figure 4:
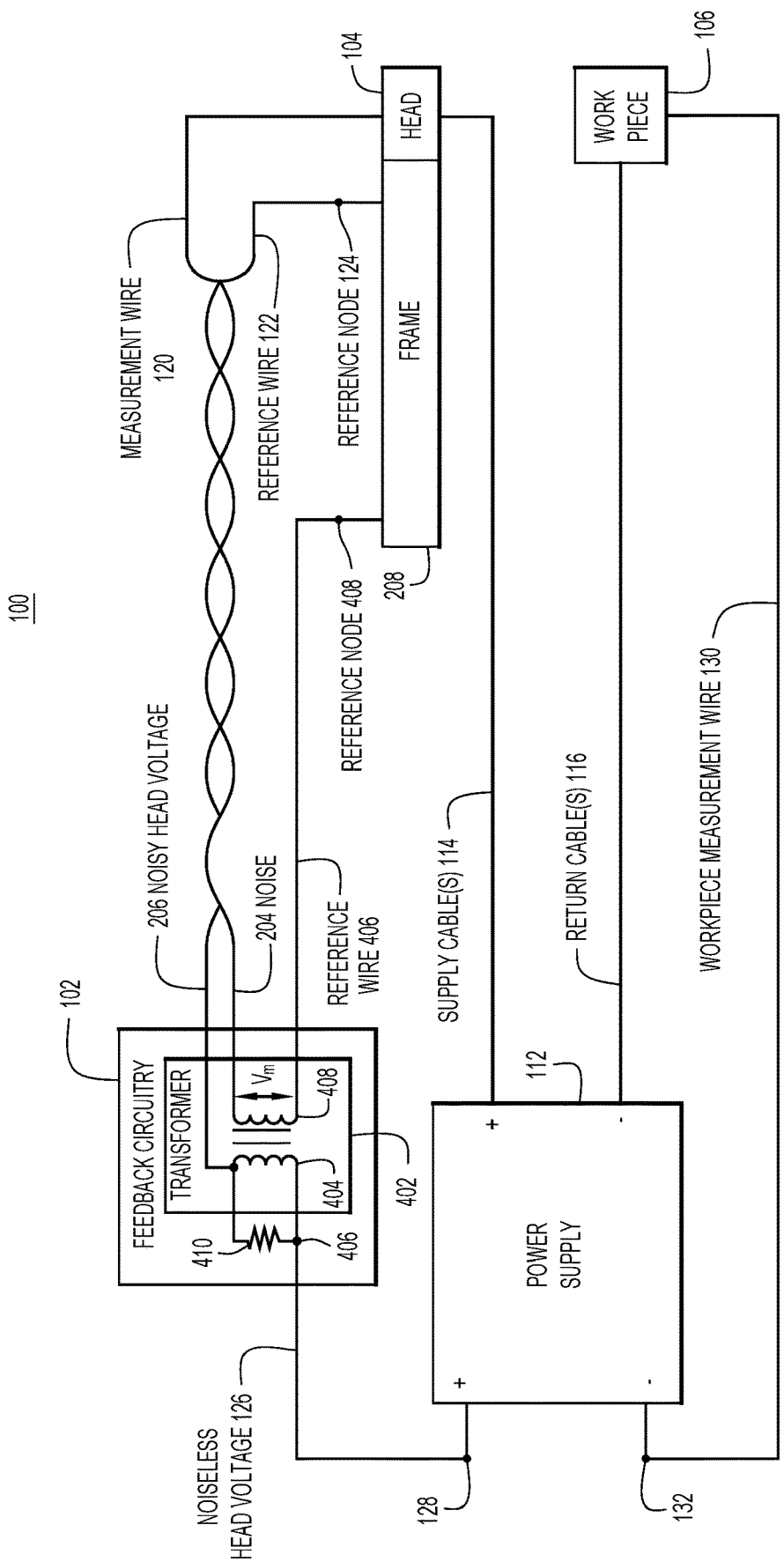
FIG. 4 is another simplified block wiring diagram of the arc welding apparatus, in which the feedback circuitry includes a transformer to subtract noise from the noisy head voltage.

FIG. 4 is another simplified block wiring diagram of arc welding apparatus 100, in which feedback circuitry 102 includes a transformer 402 to subtract noise 204 (i.e., $V_m$), from noisy head voltage 206. Feedback circuitry 102 further includes a resistor 410 to establish a voltage at node 406 based on current induced in and/or applied to secondary winding 404.

In this example, node 406 is biased with noisy head voltage 206 of measurement wire 120. Also, noise 204 (i.e., $V_m$) of reference wire 122 is applied to a primary winding 408 of transformer 402, to induce an inverted version of noise 204 (i.e., $-V_m$) at node 406. Noisy head voltage 206 at node 406 is thus reduced by the inverted version of noise 204, to provide noiseless head voltage 126.

Transformer 402 also serves to isolate input node 128 of power supply 112 from $V_m$.

In the example of FIG. 4, primary winding 404 and secondary winding 408 are illustrated with a same number of windings. In another embodiment, primary winding 404 may have more or fewer windings that secondary winding 408.

An advantage of techniques disclosed herein is that compensation follows $V_m$, so it will give equal compensation if there is DC current, higher/lower AC current, AC offset, AC balance, frequency or magnetic fields from welding cables and/or other AC welding power sources.

Figure 5:
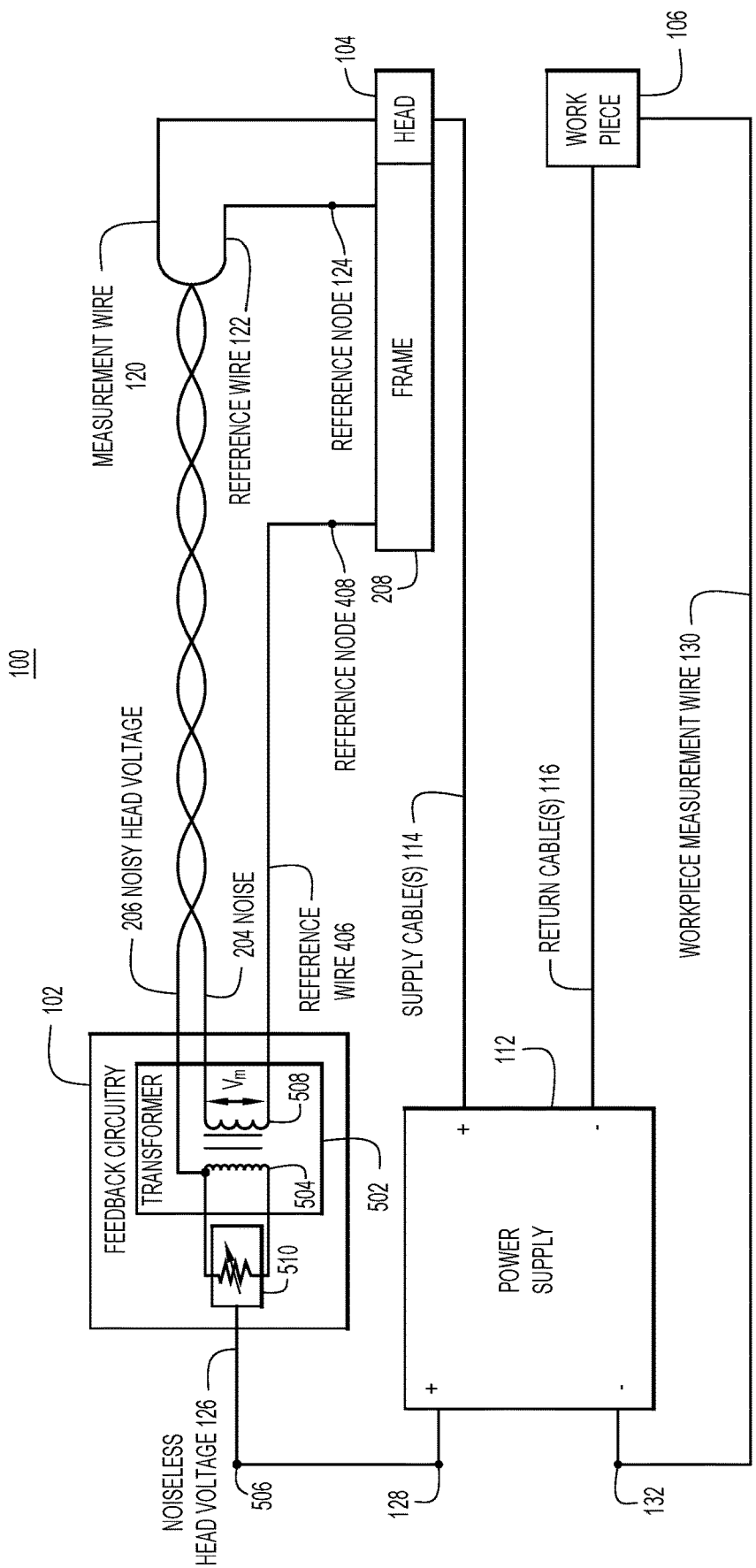
FIG. 5 is another simplified block wiring diagram of the arc welding apparatus, in which the feedback circuitry includes a 2:1 transformer to subtract noise from noisy head voltage, and a potentiometer to control a level of compensation.

FIG. 5 is another simplified block wiring diagram of arc welding apparatus 100, in which feedback circuitry 102 includes a transformer 502 to subtract noise 204 from noisy head voltage 206, substantially as described above with respect to FIG. 4.

In FIG. 5, transformer 502 is illustrated as a 2:1 transformer with a primary winding 508 to amplify the inverted version of $V_m$ induced in a secondary winding 504 by two.

Further in the example of FIG. 5, feedback circuitry 102 includes a potentiometer 510 configured as an adjustable voltage divider. Potentiometer 510 may be useful to adjust the magnitude of the inverted amplified version of $V_m$ induced a node 506 (e.g., between 0 and 200% of $V_m$), which is subtracted from noisy head voltage 206. Potentiometer 510 may be used to adjust compensation, such as to adjust level disturbances generated in measurement wire 120 due to magnetic fields.

Transformer 402 in FIG. 4 and/or transformer 502 in FIG. 5 may include a signal transformer or a pulse transformer. A pulse transformer is a transformer that is optimized for transmitting rectangular electrical pulses (i.e., pulses with fast rise and fall times and a relatively constant amplitude).

Techniques to subtract noise 204 from noisy head voltage 206, as disclosed herein, are not limited to transformer examples provided herein. Rather, noise 204 may be removed from noisy head voltage 206 with devices other than, or in addition to a transformer.

Workpiece measurement wire 130, as illustrated in any one or more of FIGS. 1 through 5, may also be subjected to disturbances. Such disturbances may include magnetic fields generated by return cable(s) 116 and/or supply cable(s) 114, of arc welding apparatus 100 and/or other arc welding apparatuses. Such disturbances may be compensated with techniques described above with respect to one or more of FIGS. 1-5. An example is provided below with reference to FIG. 6.

Figure 6:
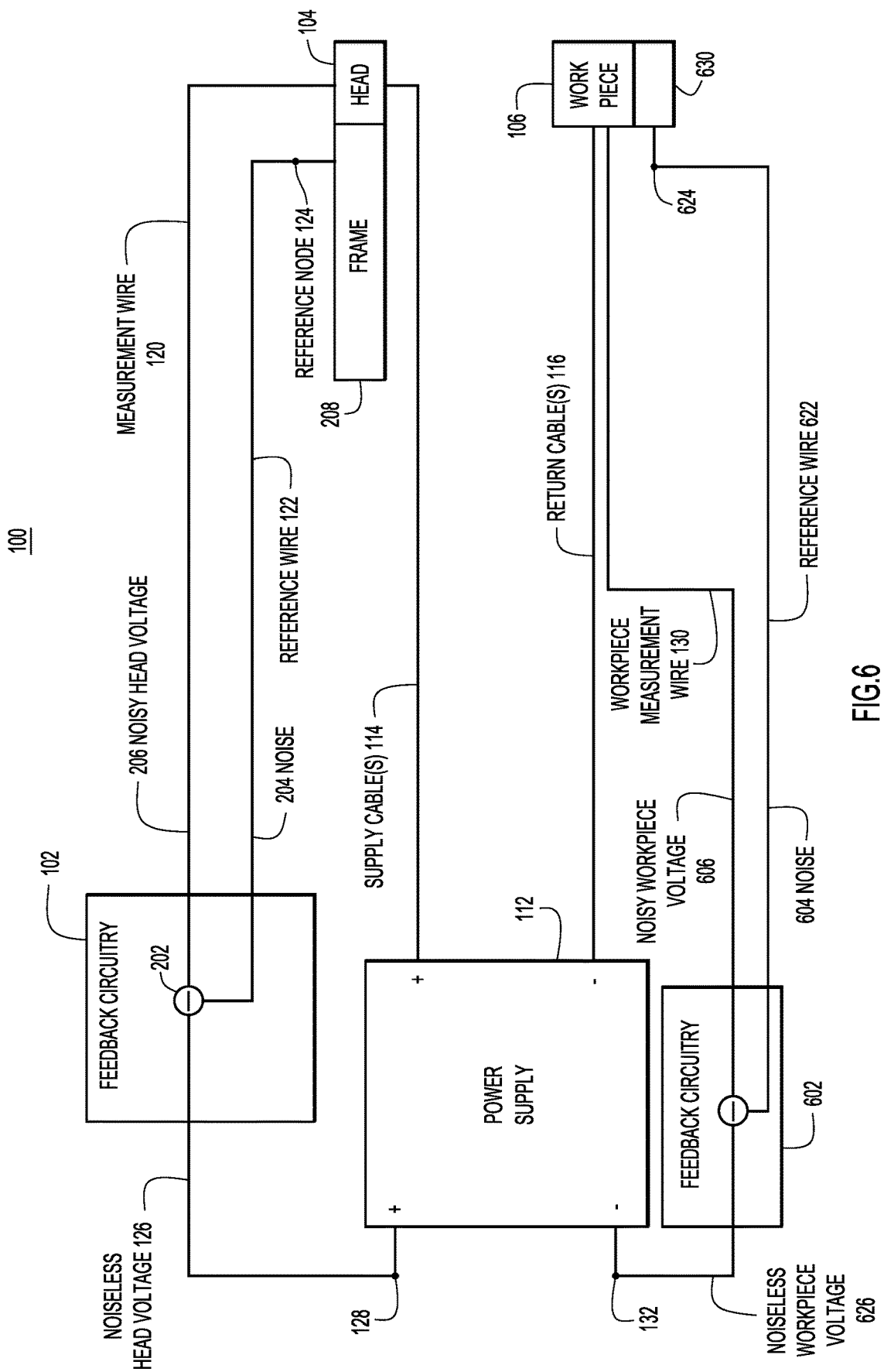
FIG. 6 is another simplified block wiring diagram of the arc welding apparatus, which includes additional feedback circuity to remove disturbances induced on a workpiece measurement wire.

FIG. 6 is another simplified block wiring diagram of arc welding apparatus 100, which includes additional feedback circuity 602 to remove disturbances induced on workpiece measurement wire 130.

In this example, a reference wire 622 is coupled to a node 624 that is proximate to, and electrically isolated from workpiece 106. Node 624 may correspond to a workbench or other support structure 630 on which workpiece 106 rests. Node 624 and/or support structure 630 may be electrically conductive and may be nominally coupled to ground or other voltage reference point.

Workpiece measurement wire 130 and reference wire 622 are arranged proximate and/or adjacent to one another along a path to feedback circuitry 602, so that reference wire 622 is subjected to the same or similar disturbances as measurement wire 130

Feedback circuitry 602 is configured to subtract noise 604 induced on reference wire 622 from a noisy workpiece voltage 606 of measurement wire 130. Feedback circuitry 602 may be configured similar to feedback circuitry 102 as described in one or more examples above to generate a noiseless workpiece voltage 626.

Feedback circuitry 102 and 602 may be used in conjunction with one another, as illustrated in FIG. 6. Alternatively, feedback circuitry 102 may be implemented without feedback circuitry 602, or feedback circuitry 602 may be implemented without feedback circuitry 102.

Figure 7:
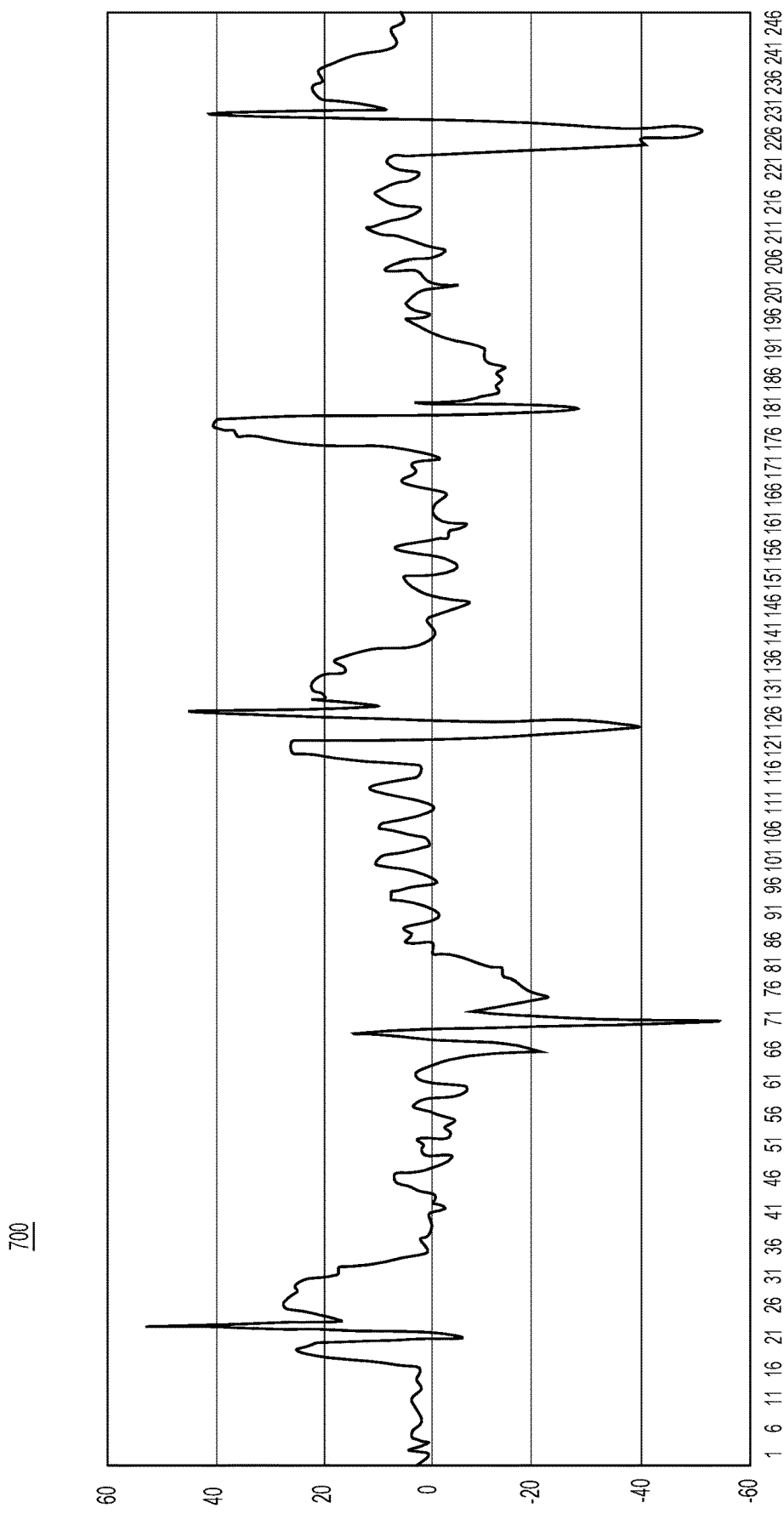
FIG. 7 illustrates an example disturbance waveform induced in a reference wire.

FIG. 7 illustrates an example disturbance (e.g., noise 204 or $V_m$), as a waveform 700.

Figure 8:
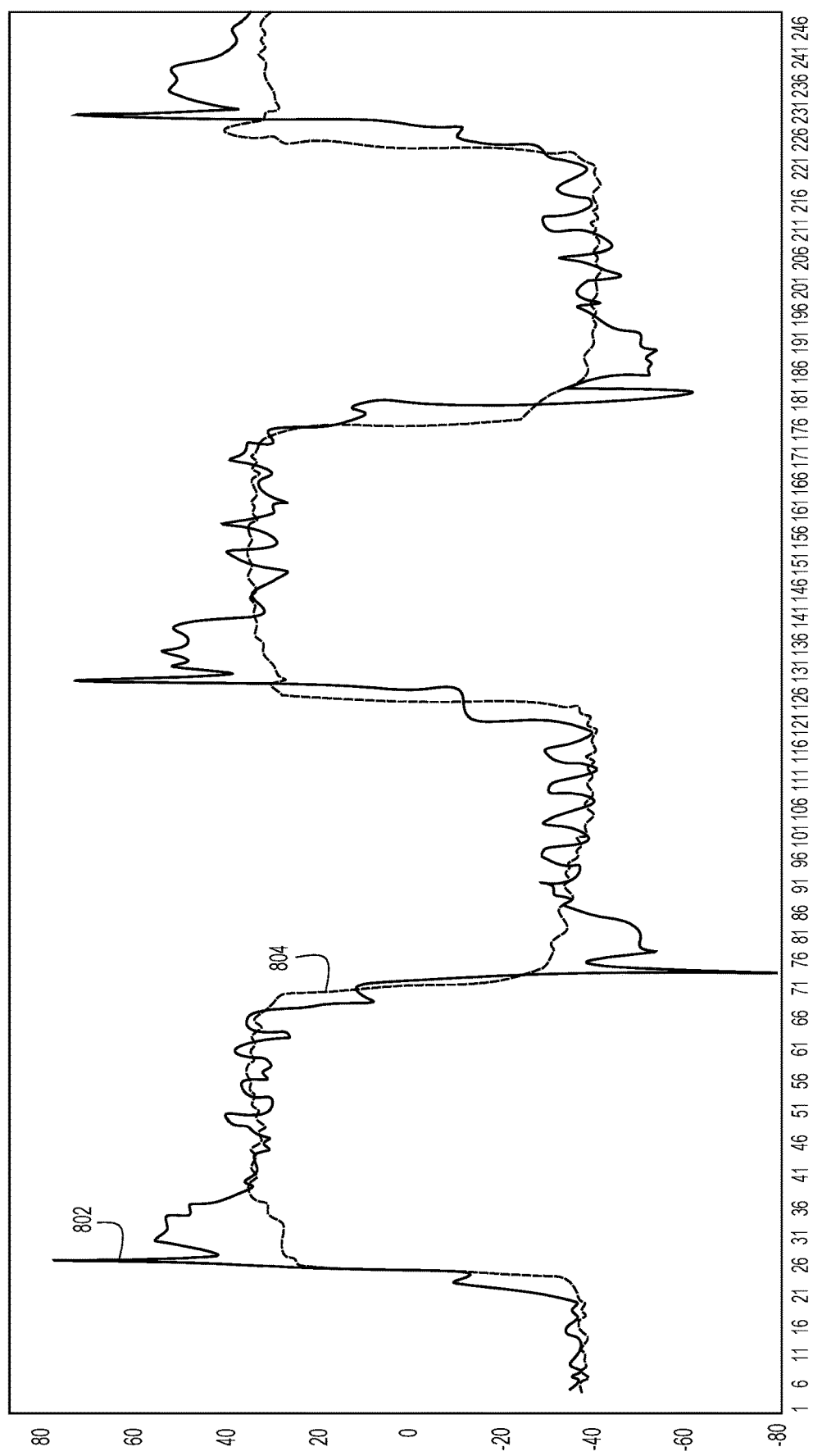
FIG. 8 illustrates an example noisy head voltage waveform, and a corresponding noiseless head voltage waveform.

FIG. 8 illustrates an example noisy head voltage (e.g., noisy head voltage 206), as a waveform 802, and a corresponding noiseless head voltage (e.g., noiseless head voltage 126), as a waveform 804.

Figure 9:
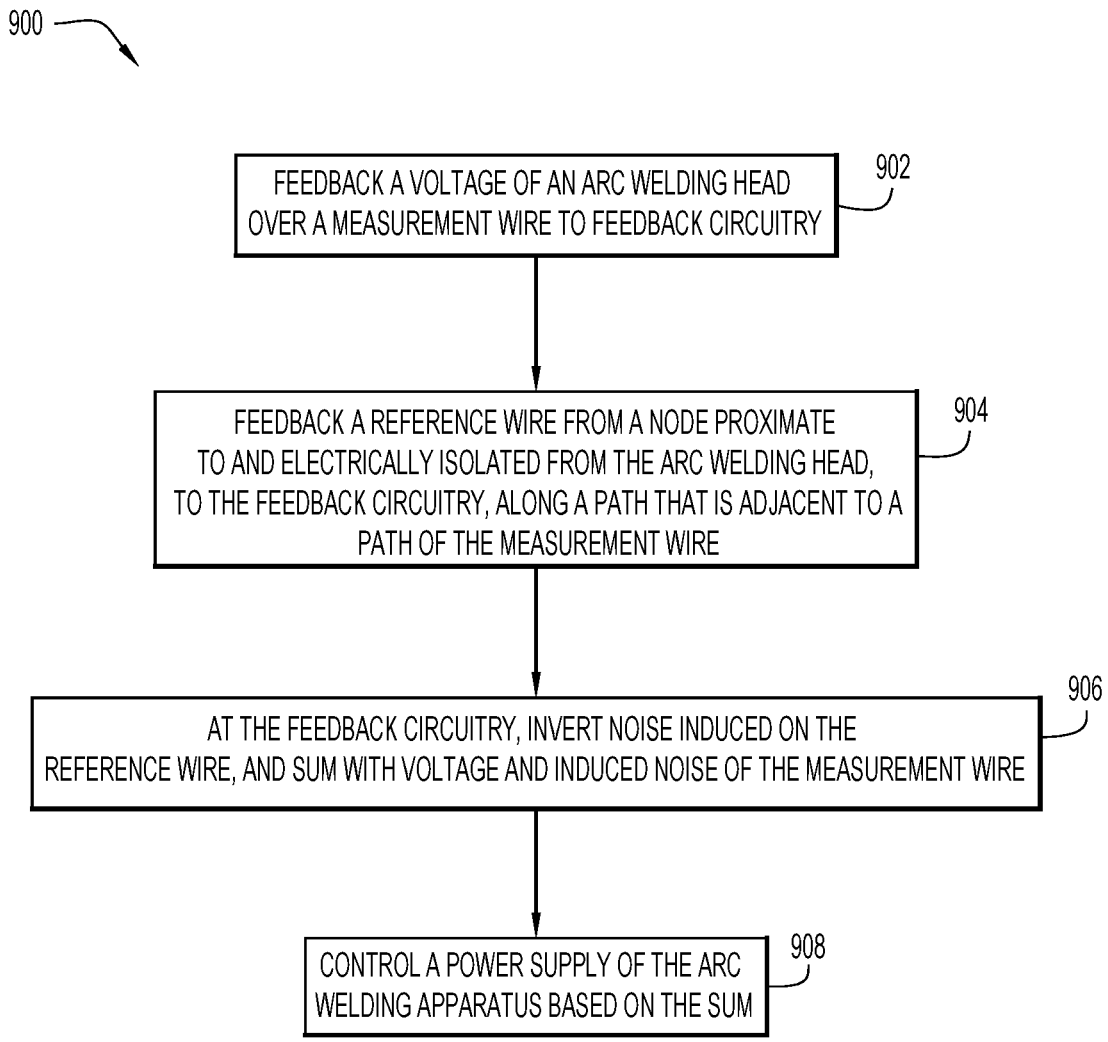
FIG. 9 is a flowchart of a method of removing or reducing disturbances induced on a voltage measurement wire.

FIG. 9 is a flowchart of a method 900 of removing or reducing disturbances induced on a voltage measurement wire. Method 900 is described below with reference to a voltage measurement wire of an arc welding apparatus. Method 900 is not, however, limited to an arc welding apparatus.

At 902, a voltage of an arc welding head is provided to feedback circuitry over a measurement wire, such as described in one or more examples above.

At 904, a voltage reference is provided to the feedback circuitry from a node proximate to and electrically isolated from the arc welding head, along a path that is adjacent to a path of the measurement wire.

At 906, noise induced on the reference wire is inverted and summed with voltage and noise of the measurement wire, at the feedback circuitry.

At 908, a power supply of the arc welding apparatus is controlled based on the sum determined at 906.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:
1. An apparatus, comprising:
 a first feedback circuit configured to provide a head voltage of an arc welding apparatus to a power supply of the arc welding apparatus;

a first measurement wire coupled to a head of the arc welding apparatus and to a first input of the first feedback circuit to provide the head voltage and noise induced on the first measurement wire to the first feedback circuit; and a first reference wire coupled to a first reference node of the arc welding apparatus and to a second input of the first feedback circuit to provide noise induced on the first reference wire to the feedback circuit, wherein the first reference node is proximate to and electrically isolated from the head of the arc welding apparatus, and wherein the first reference wire and the first measurement wire are arranged adjacent to one another along a path to the first feedback circuitry circuit such that the noise induced on the first reference wire is equal to noise induced on the first measurement wire;

wherein the first feedback circuit includes a transformer and a resistor and is configured to determine the head voltage as a difference between (i) a sum of the head voltage and the noise induced on the first measurement wire and (ii) the noise induced on the first reference wire.

2. The apparatus of claim 1, wherein the first feedback circuit is configured to:
invert the noise induced on the first reference wire; and
sum inverted noise induced on the first reference wire with the head voltage and noise induced on the first measurement wire.

3. The apparatus of claim 2, wherein the first feedback circuit includes:
a potentiometer to control an amplitude of the noise induced on the first reference wire that is summed with the head voltage and noise induced on the first measurement wire.

4. The apparatus of claim 1, wherein:
a secondary winding of the transformer is biased with the head voltage and noise induced on the first measurement wire; and
the noise induced on the first reference wire is applied to a primary winding of the transformer to induce an inverted version of the noise induced on the first reference wire in the secondary winding to cancel the noise induced on the first measurement wire.

5. The apparatus of claim 4, wherein the first feedback circuit further includes:
a potentiometer to control amplification of the inverted version of the noise induced on the first reference wire that is summed with the head voltage and noise induced on the first measurement wire.

6. The apparatus of claim 1, wherein the first measurement wire and the first reference wire are configured as a twisted pair of wires.

7. The apparatus of claim 1, further including:
a second feedback circuit configured to provide a voltage of a workpiece to the power supply;
a second measurement wire coupled to the workpiece and to a first input of the second feedback circuit to provide the workpiece voltage and noise induced on the second measurement wire to the second feedback circuit; and
a second reference wire coupled to a second reference node of the arc welding apparatus and to a second input of the second feedback circuit to provide noise induced on the second reference wire to the second feedback circuit, wherein the second reference node is proximate to and electrically isolated from the workpiece.

8. An arc welding apparatus, comprising:
an arc welding head;
a boom to support the arc welding head;
a column to support the boom;
a power supply to provide a voltage between the arc welding head and a workpiece;
a first feedback circuit configured to provide a head voltage to the power supply;
a first measurement wire coupled to the arc welding head and to a first input of the first feedback circuit to provide the head voltage and noise induced on the first measurement wire to the first feedback circuit; and
a first reference wire coupled to a first reference node of the arc welding apparatus and to a second input of the first feedback circuit to provide noise induced on the first reference wire to the feedback circuit first, wherein the first reference node is proximate to and electrically isolated from the arc welding head, and wherein the first reference wire and the first measurement wire are arranged adjacent to one another along a path to the first feedback circuit such that the noise induced on the first reference wire is equal to noise induced on the first measurement wire;

wherein the first feedback circuit includes a transformer and a resistor and is configured to determine the head voltage as a difference between (i) a sum of the head voltage and the noise induced on the first measurement wire and (ii) the noise induced on the first reference wire.

9. The arc welding apparatus of claim 8, wherein the first feedback circuit is configured to:
invert the noise induced on the first reference wire; and
sum inverted noise induced on the first reference wire with the head voltage and noise induced on the first measurement wire.

10. The arc welding apparatus of claim 9, wherein the first feedback circuit includes:
a potentiometer to control an amplitude of the noise induced on the first reference wire that is summed with the head voltage and noise induced on the first measurement wire.

11. The arc welding apparatus of claim 8, wherein:
a secondary winding of the transformer is biased with the head voltage and noise induced on the first measurement wire; and
the noise induced on the first reference wire is applied to a primary winding of the transformer to induce an inverted version of the noise induced on the first reference wire in the secondary winding to cancel the noise induced on the first measurement wire.

12. The arc welding apparatus of claim 11, wherein the first feedback circuit further includes:
a potentiometer to control amplification of the inverted version of the noise induced on the first reference wire that is summed with the head voltage and noise induced on the first measurement wire.

13. The arc welding apparatus of claim 8, wherein the first measurement wire and the first reference wire are configured as a twisted pair of wires.

14. The arc welding apparatus of claim 8, further including:
a second feedback circuit configured to provide a workpiece voltage to the power supply;
a second measurement wire coupled to the workpiece and to a first input of the second feedback circuit to provide the workpiece voltage and noise induced on the second measurement wire to the second feedback circuit; and a second reference wire coupled to a second reference node of the arc welding apparatus and to a second input of the second feedback circuit to provide noise induced on the second reference wire to the second feedback circuit, wherein the second reference node is proximate to and electrically isolated from the workpiece.

15. A method for removing noise on a head voltage measurement wire, comprising:

inverting noise induced on a reference wire to obtain an inverted noise signal, wherein the reference wire is coupled to a node proximate to and electrically isolated from a head of an arc welding apparatus, and wherein a path of the reference wire is adjacent to a path of a head voltage measurement wire of the arc welding apparatus such that the noise induced on the reference wire is equal to noise induced on the head voltage measurement wire;

summing the inverted noise signal with a head voltage received over the head voltage measurement wire, and with the noise induced on the head voltage measurement wire, to generate a noiseless head voltage signal; and controlling a power supply of the arc welding apparatus based on the noiseless head voltage signal, wherein the inverting includes applying the noise induced on the reference wire to a primary winding of a transformer to induce the inverted noise signal at a node of a secondary winding of the transformer, and wherein a resistor is connected across the secondary winding of the transformer.

16. The method of claim 15, further including:

controlling an amplitude of the inverted noise signal that is summed with the head voltage and the noise induced on the head voltage measurement wire.

17. The method of claim 15, wherein:

the summing includes applying the head voltage and noise induced on the head voltage measurement wire to the node of the secondary winding.

\* \* \* \* \*